No. 790,491. PATENTED MAY 23, 1905.
H. B. FABER & H. E. SEAL.
MOLD FOR MAKING RUBBER BALLOON BAGS.
APPLICATION FILED FEB. 4, 1904.
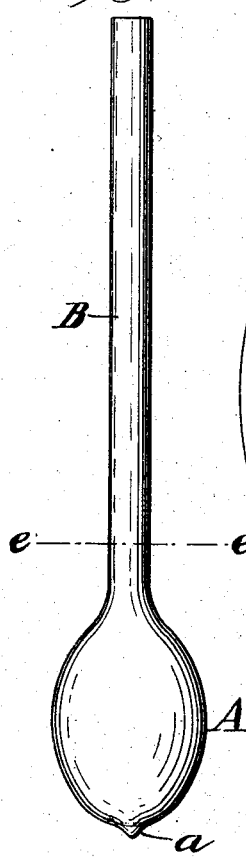
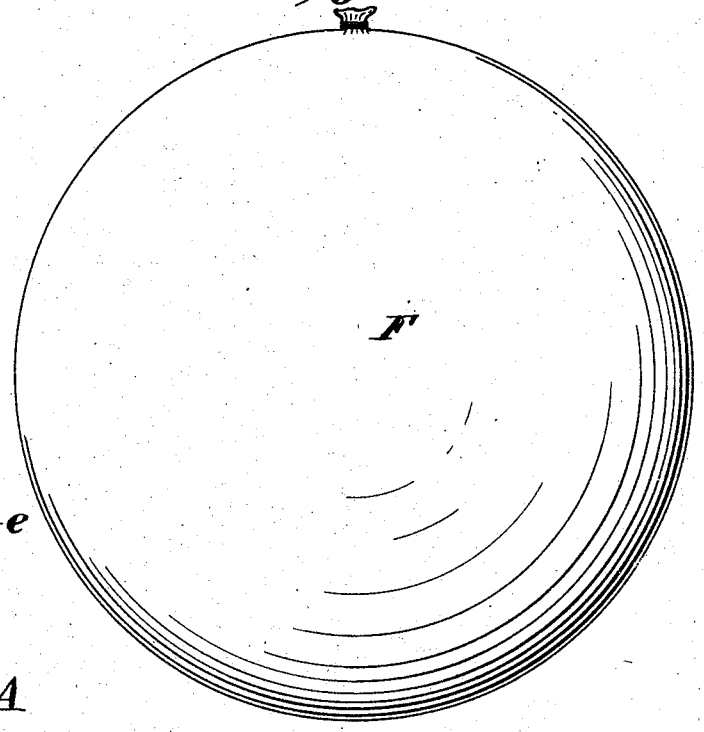
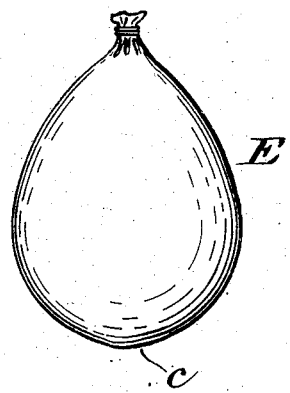
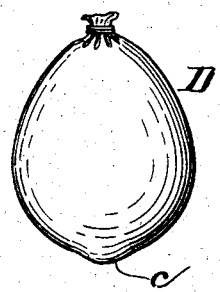
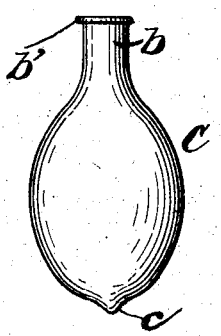
Henry B. Faber
Harry E. Seal
Inventors No. 790,491. Patented May 23, 1905.

UNITED STATES PATENT OFFICE.

HENRY B. FABER AND HARRY E. SEAL, OF NEW YORK, N. Y., ASSIGNORS TO RUBBER BALLOON COMPANY OF AMERICA, OF BROOKLYN, NEW YORK, A CORPORATION OF NEW YORK.

MOLD FOR MAKING RUBBER BALLOON-BAGS.

SPECIFICATION forming part of Letters Patent No. 790,491, dated May 23, 1905.

Application filed February 4, 1904. Serial No. 192,007.

*To all whom it may concern:*

Be it known that we, HENRY B. FABER and HARRY E. SEAL, citizens of the United States, and residents of the borough of Brooklyn, city of New York, in the county of Kings and State of New York, have invented certain new and useful Improvements in Molds for Making Rubber Balloon-Bags, of which the following is a specification.

This invention relates to improvements in toy balloons formed in a single piece without a seam. Such balloon-bags are made upon a mold materially smaller than the inflated balloon. The balloon-bag before inflation may be substantially of the size and shape of a hen's egg and is designed to be inflated to a diameter of six to eight inches. The bags are made by dipping the mold in a solution of rubber or similar material, then drying the coating, and repeating the dipping and drying until the desired thickness is attained, when the deposited skin of rubber constituting the bag is vulcanized and stripped from the mold.

The invention consists in a special form of mold by which materially-improved results are obtained.

In the accompanying drawings, Figure 1 is a view in elevation, showing the mold upon which the balloon-bags are formed. Fig. 2 is a view, also in elevation, of one of the bags when removed from the mold. Figs. 3 and 4 are views in elevation, showing balloon-bags similar to Fig. 2 in different stages of initial inflation. Fig. 5 shows a balloon inflated to proper size, the scale being somewhat reduced.

The mold A, which may be substantially oval or egg-shaped in form, is preferably made of glass. Other suitable materials, such as hard rubber, may be used. The mold is provided with a stem or handle B of reduced dimensions extending from its top and upon the lower part of which, ending about line $e$ $e$, is formed the neck $b$ of the balloon-bag, which is provided with a reinforce-strip at the edge $b'$.

The mold is constructed with a small tapering or conical protuberance or teat $c$, springing from the bottom thereof, and which may be round, square, or polyhedral and is best placed with its apex coincident with the longitudinal axis of the mold, although it may be somewhat displaced, the purpose being in dipping that the apex of the cone shall first enter and last leave the solution.

C, Fig. 2, indicates a balloon-bag removed from the mold, $c$ being the extension formed by cone $a$.

D, Fig. 3, shows the bag slightly inflated, the extension $c$ being somewhat expanded and flattened.

E, Fig. 4, shows further inflation of the bag and greater expansion of the extension $c$, and F, Fig. 5, indicates, on reduced scale, a fully-inflated balloon in which the extension $c$ has become obliterated.

In using the mold it is dipped into the solution, then withdrawn inverted, and the deposited coating dried. This operation is repeated until the desired thickness of rubber is deposited upon the mold, after which the reinforcing-strip is applied at the edge $b$, the bag vulcanized on the mold and stripped therefrom. Experience has shown that if the bottom of the mold be a symmetrical continuation of the curve of the sides drops of the solution inclosing a bubble of air are liable to occur at the bottom of the mold and cannot satisfactorily be eliminated by inversion. It has been found in practical use that the employment of a small pointed tapering or conical projection at the bottom of the mold obviates this difficulty, and such improved result is believed to be due to the fact that as the mold is lifted from the solution the teat or projection permits the surplus of non-adhering solution to run off at the point of the teat without occlusion of air and without the retention of a surplus of the solution at the extreme bottom of the mold.

The mold has been described as oval or egg-shaped, and experience has shown that such shape is suitable and practicable for the result sought. The use of the term "egg-shaped" in the specification and claim is not, however, intended to exclude such departures from that shape as may be adopted without impairment or material impairment of the operation of manufacture or the product produced.

This invention is distinguished from the patent of Whisler, No. 726,009, by the presence of the projection on the bottom of the mold, and from the patent of Harris, No. 718,121, not only by the presence of the projection, but also by the shape of the mold.

We claim as our invention—

A mold, for making seamless rubber balloon-bags, having an egg-shaped body with a tapering projection on the bottom and adapted to be used as described.

Signed at New York, in the county of New York and State of New York, this 29th day of September, A. D. 1903.

HENRY B. FABER.
          HARRY E. SEAL.

Witnesses:
    FRANKLAND JANNUS,
    GEO. H. RUDOLPH.